United States Patent [19]
Cole et al.

[11] Patent Number: 5,242,769
[45] Date of Patent: Sep. 7, 1993

[54] BATTERY CARRYING HANDLE

[75] Inventors: Bruce A. Cole, Northbrook; Joseph J. Jergl, Bolingbrook, both of Ill.

[73] Assignee: GNB Industrial Battery Company, Lombard, Ill.

[21] Appl. No.: 802,258

[22] Filed: Dec. 4, 1991

[51] Int. Cl.⁵ .............................. H01M 2/10
[52] U.S. Cl. ...................... 429/187; 16/114 R; 16/DIG. 15
[58] Field of Search ..... 429/187; 16/114 R, DIG. 15, 16/DIG. 24

[56] References Cited

U.S. PATENT DOCUMENTS

| | | | |
|---|---|---|---|
| 1,540,155 | 6/1925 | Wydom et al. | 429/187 X |
| 2,289,824 | 7/1942 | Brogden | 229/52 |
| 2,621,357 | 12/1952 | Stuman | 16/114 R |
| 3,093,515 | 6/1963 | Rector | 136/166 |
| 3,815,175 | 6/1974 | Szabados | 16/114 R |
| 3,956,022 | 5/1976 | Fox | 136/181 |
| 4,029,248 | 6/1977 | Lee | 224/45 F |
| 4,042,762 | 8/1977 | Hakarine | 429/187 |
| 4,044,935 | 8/1977 | Stephens | 224/45 F |
| 4,424,264 | 1/1984 | McGuire et al. | 429/179 |
| 4,448,863 | 5/1984 | Terrell | 429/178 |
| 4,632,888 | 12/1986 | Kump et al. | 429/187 |
| 4,634,193 | 1/1987 | Liu | 16/114 R |
| 4,673,625 | 6/1987 | McCartney et al. | 429/187 |
| 4,752,543 | 6/1988 | Anderson et al. | 429/179 |

FOREIGN PATENT DOCUMENTS 627030 11/1934 Fed. Rep. of Germany .
1290147 9/1972 United Kingdom .

*Primary Examiner*—Stephen Kalafut
*Attorney, Agent, or Firm*—Leydig, Voit & Mayer

[57] ABSTRACT

An assembly for removably attaching a battery handle to an electric storage battery is provided. The assembly comprises a pair of channels and a pair of projecting members slidably engageable with the channels, wherein (a) the channels are disposed on the battery casing and the projecting members are disposed on the battery handle, or vice versa, (b) the channels have an open end adapted to allow passage of the projecting members into and out of the interior of the channel, (c) the assembly comprises means for limiting the travel of the projecting members through the interior of the channels such that the projecting members are unable to pass through the other end of the channels, and (d) the channels and projecting members are disposed such that the handle may be attached and detached to the casing by slidably inserting and withdrawing the projecting members from the interior of the channels through its open ends and when the projecting members are disposed in the interior of the channels and the battery is lifted by said handle, the projecting members are urged against the travel limiting means.

19 Claims, 4 Drawing Sheets

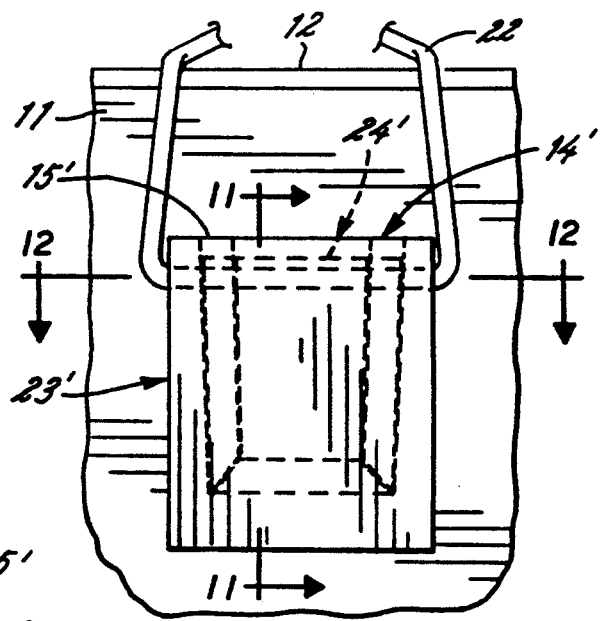
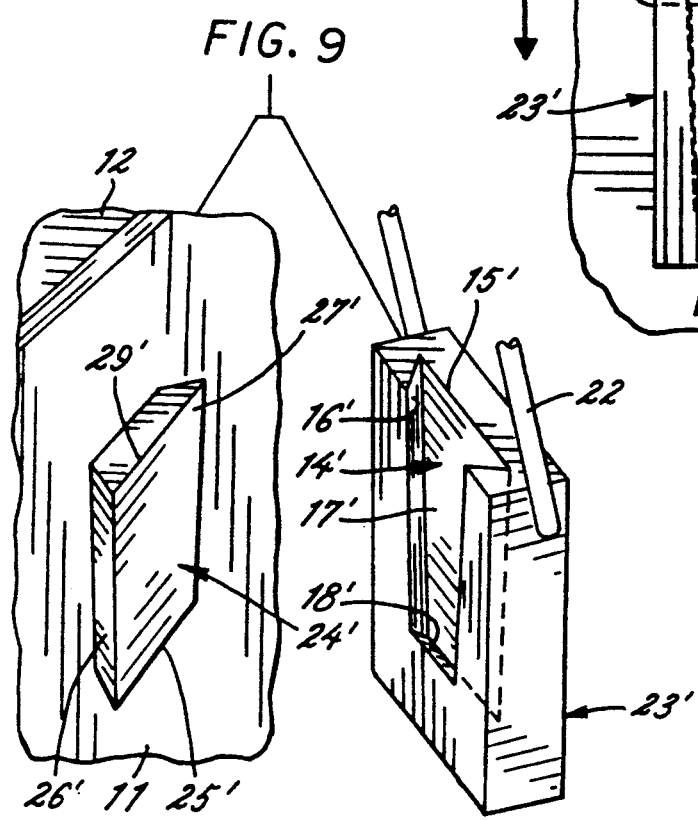
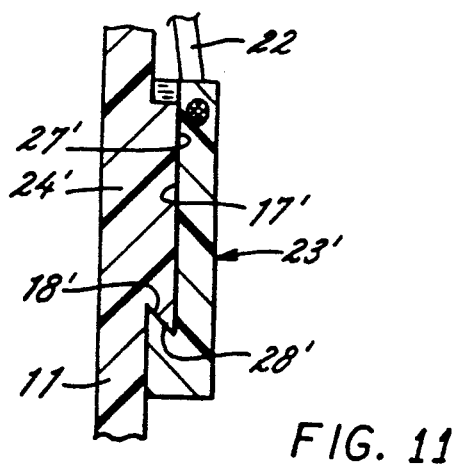
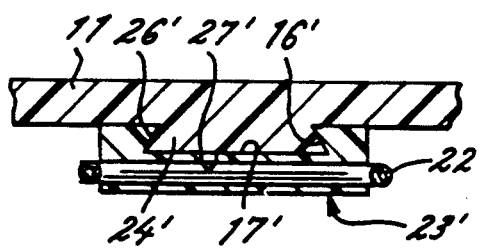

BATTERY CARRYING HANDLE

TECHNICAL FIELD

The present invention relates to battery carrying handles and more particularly to improved means for removably attaching a battery handle to a battery casing.

BACKGROUND OF THE INVENTION

Both the provision and advantages of battery carrying handles are well known, especially a bail-type handle. Bail handles typically comprise a U- or C- shape member attached to opposing sides of a battery casing, either on its container or cover. With such handles the battery may be carried in much the same fashion as a picnic basket or pail. Handles are a particular convenience in batteries designed for use in boats or in uninterrupted power supply (UPS) applications which must be frequently moved for storage, service, or recharging.

Frequently, however, bail handles tend to interfere with one or more of the many types of devices by which batteries are mounted. Thus, bail handles can make it more difficult to design a battery which is suitable for use with all types of mounting devices.

One approach to that problem has been to design bail handles which fit into a recess in the battery casing when the handle is not in use. Examples of such recessible designs are disclosed, e.g., in U.S. Pat. No. 4,448,863 to C. Terrell; and U.S. Pat. No. 4,424,264 to M. McGuire et al. Typically, however, the design of such recessible handles is complicated and/or the handle is not easily manufactured or assembled.

For example, thermoplastic polymers are the materials of choice for battery casings and handles, but many recessible handle designs require complicated molds and are expensive and difficult to mold. Some handles must be attached simultaneously with the sealing of the battery cover to the container, and to that extent, the assembly of the battery is unnecessarily complicated. Other handles must be distorted considerably to attach them. Thus, they are somewhat difficult to attach and must be made of relatively resilient material not entirely suitable for supporting the weight of the battery without a real possibility of detaching.

Another approach has been to utilize handles which can be detached and removed from the battery after installation. Examples of detachable bail handles are disclosed, e.g., in U.S. Pat. No. 4,029,748 to F. Lee; U.S. Pat. No. 3,956,022 to A. Fox; and U.S. Pat. No. 3,093,515 to R. Rector. While detachable bail handles can offer certain advantages, they are not entirely successful in permitting the battery to be adaptable to al mounting devices. The means for detachably connecting the ends of the bail handle to the battery casing typically comprise members which project from the overall geometry of the casing, even when the handle is detached, and can interfere with some mounting devices.

Despite the general advantages of having battery carrying handles, battery handles necessarily add cost to the battery. Institutional customers, such as those who use batteries in UPS applications, may not need a handle for each battery and, because they tend to have established maintenance procedures, may be satisfied with a single handle for use in handling many batteries.

Prior art handles, however, are not susceptible to easy attachment and detachment. For example, recessible handles in general are designed not to be detached by the consumer. Even those which may be relatively easily attached, e.g., as disclosed in U.S. Pat. No. 4,632,888 to W. Kump et al., requires some dexterity to detach. That also is true of many detachable designs. Detachment and attachment may require relatively precise alignment of cooperating parts and/or multiple motions. This may make them less than ideally suited to using a single handle.

Further, when the handle of many prior art designs is removed, the absence of the handle is conspicuous and the overall aesthetic appeal of the battery may be diminished. A neat and clean design, however, may convey to the consumer a sense of quality which may be transferred to the functional performance of the battery as well. This sense may be difficult to create if many conventional designs were to be sold without a handle.

For other applications, such as consumer marine applications, it is necessary as a practical matter to provide a handle with each battery. Naturally, it is preferable that the handle is attachable in such a manner that it cannot become accidentally detached and lost during the course of distributing the battery to the ultimate consumer. Heretofore, however, prior art designs have failed to provide attachment means by which the bail handle may be easily removed with a minimum of physical dexterity but which will prevent unintended detachment of the battery handle.

An object of this invention, therefore, is to provide a bail-type battery handle which is simply, easily, and economically manufactured and strong and reliable in use, yet which may be easily attached and detached with a minimum of physical dexterity required.

It also is an object to provide a carrying handle which can be easily attached and detached with a minimum of physical dexterity, but which also is not susceptible to being inadvertently detached during distribution.

It is a further object of this invention to provide a battery handle which is removably attached to the battery casing, yet when detached offers no projecting members which can tend to interfere with mounting devices.

A further object is to provide a battery handle the absence of which, when removed, will not be conspicuous and otherwise diminish the aesthetic appeal of the battery.

Yet another object of the invention is to provide a battery carrying handle which has some or all of the above advantages.

These and other objects and advantages of the invention will be apparent to those skilled in the art upon reading the following detailed description and upon reference to the drawings.

SUMMARY OF THE INVENTION

Those objects are achieved by incorporating certain new and useful assemblies for removably attaching battery handles to battery casings. In accordance therewith, this invention provides for an assembly for removably attaching a battery handle to a battery casing, which assembly comprises a pair of channels and a pair of projecting members slidably engageable with the channels, wherein (a) the channels are disposed on the battery casing and the projecting members are disposed on the battery handle, or vice versa, (b) the channels have an open end adapted to allow passage of the projecting members into and out of the interior of the channel, (c) the assembly comprises means for limiting the travel of the projecting members through the interior of the channels such that the projecting members are unable to pass through the other end of the channels, and (d) the channels and projecting members are disposed such that the handle may be attached and detached to the casing by slidably inserting and withdrawing the projecting members from the interior of the channels through their open ends and when the projecting members are disposed in the interior of the channels and the battery is lifted by said handle, the projecting members are urged against the travel limiting means.

This invention further provides for such assemblies wherein the channel is tapered inwardly from its open end along one or more of its inner walls and the projecting members are correspondingly tapered along one or more of their outer surfaces, wherein one or more of the inner walls of said channels are angled inwardly and one or more of the outer surfaces of said projecting members are correspondingly angled such that the channels and projecting members can be engaged in a dove-tail fashion, and/or wherein said projecting members frictionally engage the casing.

BRIEF DESCRIPTION OF THE DRAWINGS

FIG. 9 is an exploded perspective view of projecting member and the terminal block of the handle which are shown in FIGS. 7 and 8.

FIG. 10 is a side elevational view showing the handle attachment assembly in greater detail.

FIG. 11 also is a more detailed view of the handle attachment assembly shown in FIGS. 7-10, the terminal block of the handle and the channel defined therein and the battery casing being shown in a cross-sectional view taken generally along lines 11—11 of FIG. 10.

FIG. 12 is a more detailed view of the handle attachment assembly shown in FIGS. 7-11, the slidable block and the battery casing being shown in a cross-sectional view taken generally along lines 12—12 of FIG. 10.

DETAILED DESCRIPTION OF THE INVENTION

Figure 1:
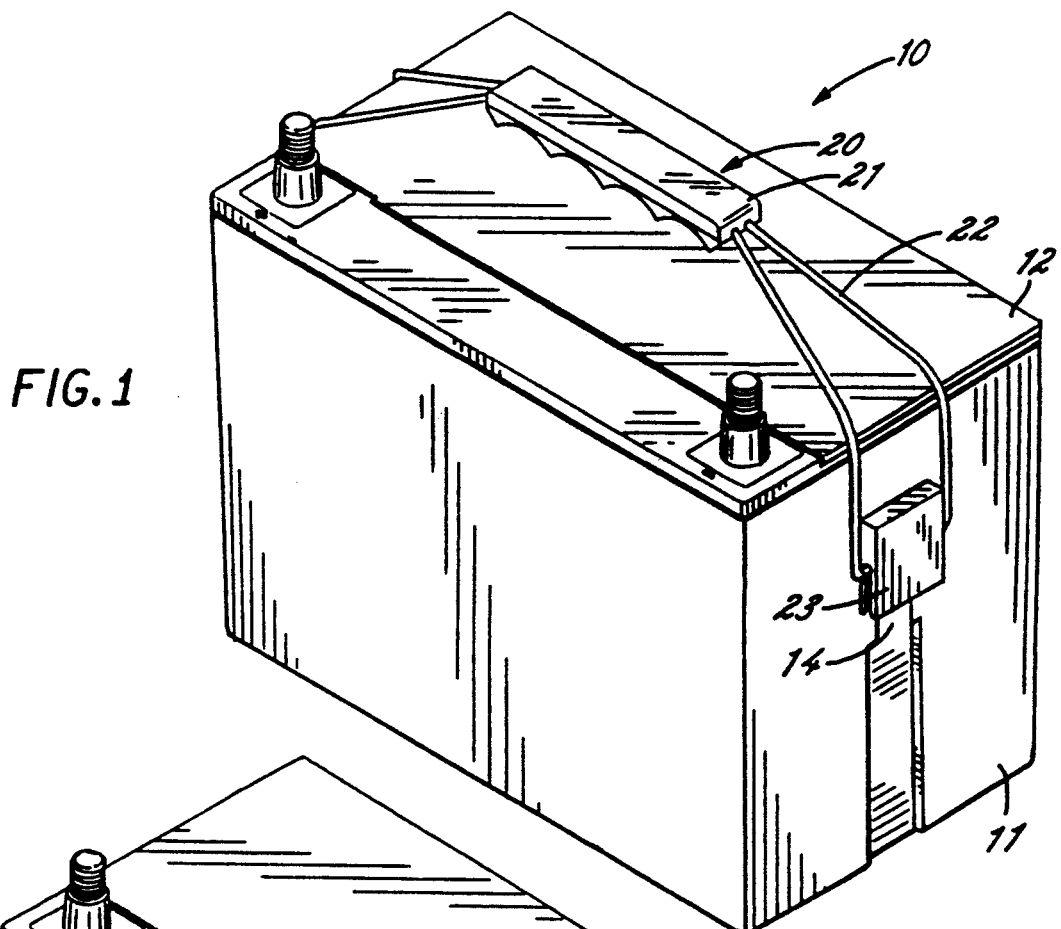
FIGS. 1 and 2 are perspective views of a battery with a carrying handle removably attached to the battery casing by a preferred embodiment of the handle attachment assemblies of the subject invention, said views, respectively, showing the battery casing with and without the handle attached thereto.
Figure 2:
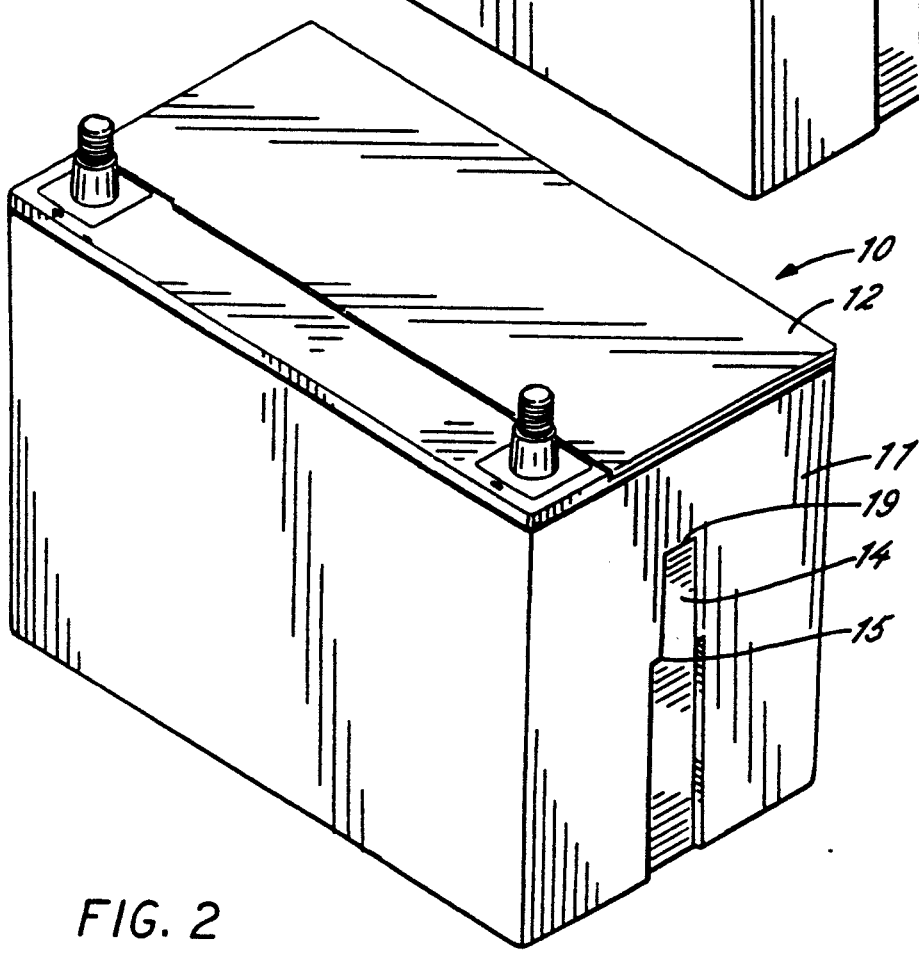

As best shown in FIGS. 1-2, the batteries with which the handle attachment assemblies of the subject invention may be used typically incorporate a generally solid-rectangularly shaped casing 10. In turn, the casing 10 usually comprises a container 11 and a cover 12.

The battery is provided with a handle 20 which is removably attached to the casing 10 by a preferred embodiment of the handle attachment assembly of the subject invention. The handle includes a grip 21, connecting cords 22, and a pair of terminal blocks 23 disposed at each end of the handle 20. The handle 20 may be attached and detached from the battery by sliding the terminal blocks 23 in and out of channels 14 provided in the casing 10.

Figure 3:
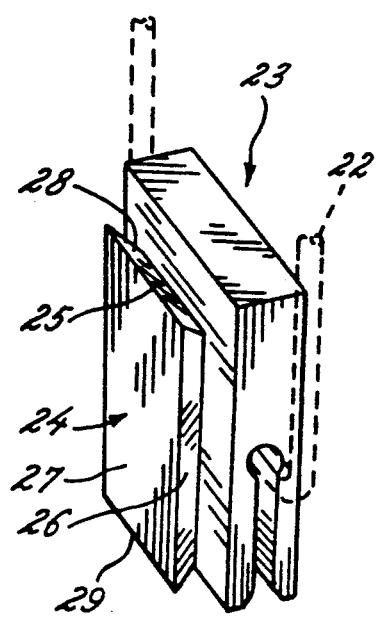
FIG. 3 is a perspective view of the terminal block of the handle shown in FIG. 1.
Figure 4:
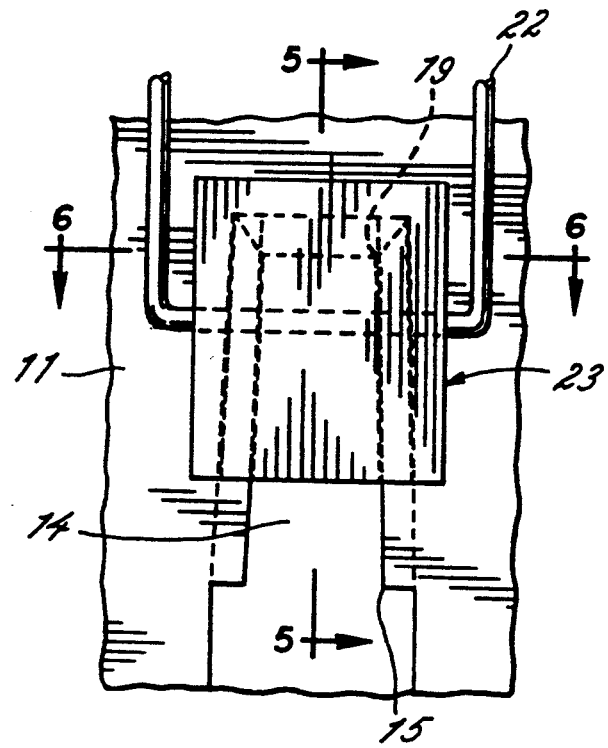
FIG. 4 is a side elevational view showing the handle attachment assembly in greater detail.
Figure 5:
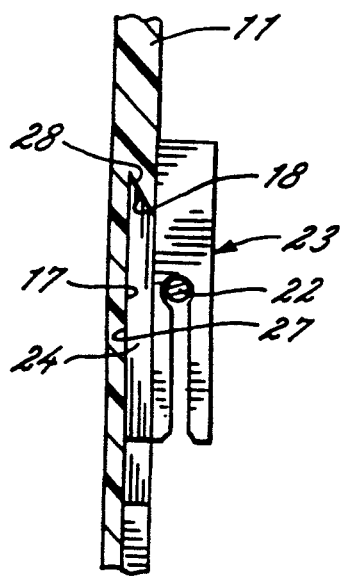
FIG. 5 also is a more detailed view of the handle attachment assembly shown in FIGS. 1-4, the terminal block of the handle being shown in a side elevational view and the battery casing and the channel defined therein being shown in a cross-sectional view taken generally along lines 5—5 of FIG. 4.
Figure 6:
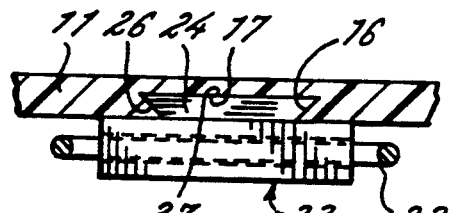
FIG. 6 is a more detailed view of the handle attachment assembly shown in FIGS. 1-5, the slidable block being shown in a top elevational view and the battery casing being shown in a cross-sectional view taken generally along lines 6—6 of FIG. 4.
Figures 7, 8:
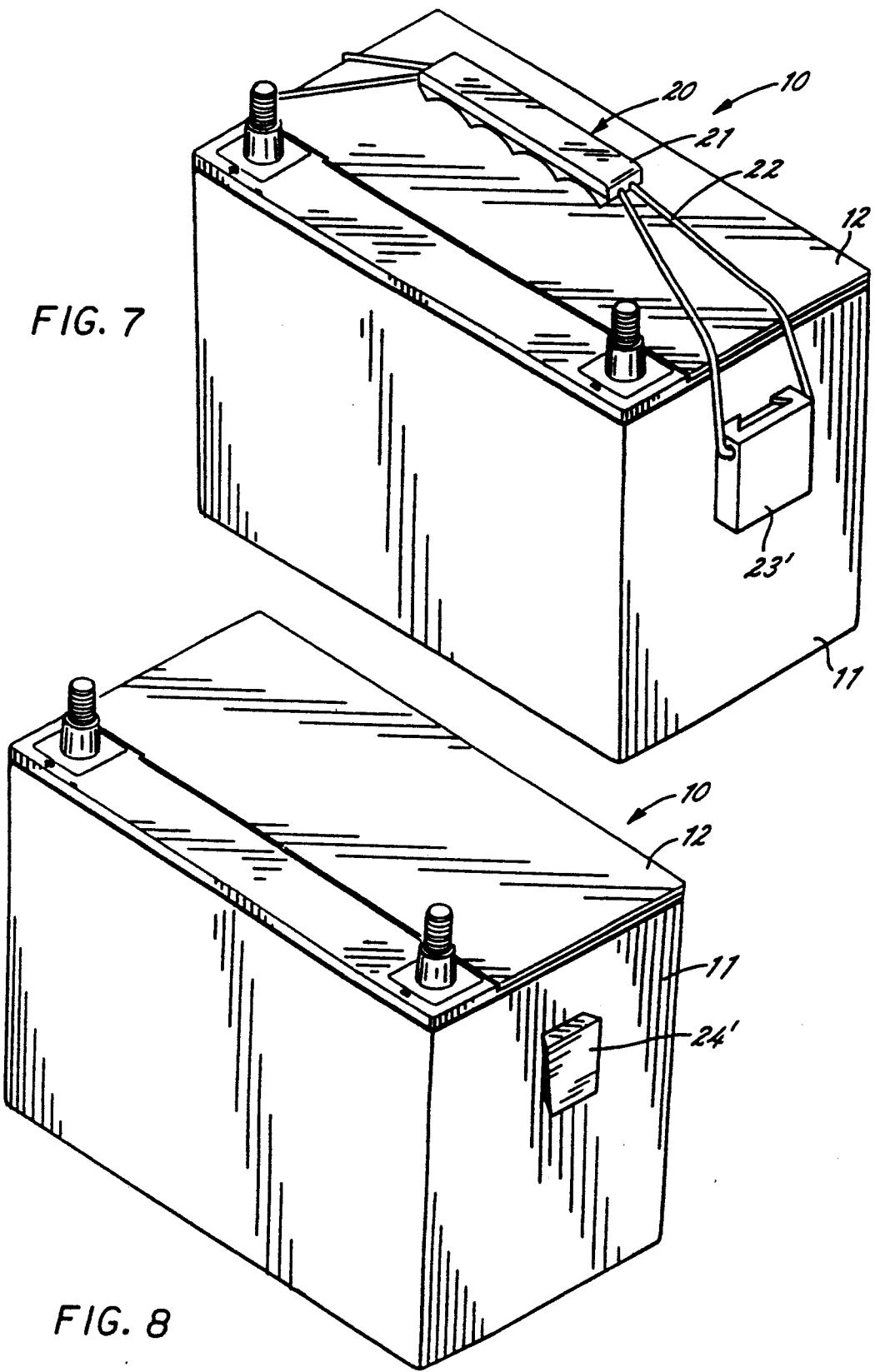
FIG. 7 and 8 are perspective views of a battery with a carrying handle removably attached to the battery casing by a second preferred embodiment of the handle attachment assemblies of the subject invention, said views, respectively, showing the battery casing with and without the handle attached thereto.

More particularly, channels 14 are provided in opposing sidewalls of the container 11 (only one of which is shown). As shown in FIG. 3, the terminal blocks 23 include projecting members 24. As best seen in FIGS. 4-6, the projecting members 24 conform generally to the interior of the channel 14, and may be slid into and out of the interior of the channel 14 via its lower, Open end 15. Further, the upper end of the channel 14 is closed, thereby providing means for limiting the travel of the terminal block projecting members 24 through the channel 14 and preventing the projecting members 24 from passing through the upper end of the channel 14.

It will be appreciated, therefore, that the handle 20 may be easily attached to the casing 10 by inserting the projecting members 24 of the terminal blocks 23 into the Open ends 15 of the channels 14. When the handle is used to carry the battery, the projecting members 24 will be urged against the closed, upper end 19 of the channel 14, thereby allowing the lifting force applied to the handle 20 to be transferred to the casing 10. The handle 20 then may be detached from the casing 10, with ease and a minimum of physical dexterity, simply by sliding the projecting members 24 of the terminal blocks 23 out of the channels 14 through their open ends 15.

As best shown in FIG. 4, and especially, the lines drawn in phantom, the channel 14 is tapered inwardly from its open end 15 along one or more of its inner walls, and specifically, its opposing side walls 16, shown in FIG. 6. Likewise, the outer surfaces of the projecting members 24 are correspondingly tapered. That is as best shown by comparing FIGS. 3-6, the outward taper from the front ends 25 of the projecting members 24 to their rear ends 29 along their side surfaces 26 are substantially the same as the inward taper in the opposing side walls 16 of the channel 14. When the projecting members 24 are fully inserted into the channels 14, the forward surface 28 and side surfaces 26 of the projecting members 24 substantially abut the end wall 18 and side walls 16 of the channels 14.

It will be appreciated, therefore, that the forward profile of the front end 25 of the projecting member 24 will be smaller than the open end 15 of the channel 14, thereby making it easier to orient the terminal block 23 for insertion of the projecting members 24 into the channel 14.

As can be seen in FIGS. 5 and 6, one or more of the inner walls of the channel 14, in this embodiment, the end wall 18 and opposing side walls 16, are angled inwardly from the bottom 17 Of the channel 14. The forward surface 28 and side surfaces 26 of the projecting members 24 have corresponding angles. That is, the angles between the bottom wall 17 and end 18 and opposing side walls 16 of the channel 14 are substantially the same as, respectively, the angles between the bottom surface 27 and the forward 28 and side surfaces 26 of the projecting members 24. In this manner, the channel 14 and projecting members 24 can be engaged in a dove-tail fashion.

It will be appreciated that by providing the corresponding tapers and angles in the channels 14 and projecting members 24, as exemplified by this preferred embodiment, the stress may be more uniformally distributed throughout the container 11 and terminal block 23. This contributes to a stronger connection between the handle 20 and casing 10, especially when the connection is subject to torque.

It may not be necessary, however, depending on the application, to utilize corresponding tapers and angles in the channels and projecting members. For example, the projecting members, instead of having a dove-tailed cross-section, can have a T-shaped or keyhole-shaped cross-section and the channel can be configured accordingly. The tapers also may be totally or partially eliminated, and the forward profile of the projecting member otherwise diminished relative to the open end of the channel to ensure easy alignment of the projecting members with the channels.

Such alternative embodiments can provide a sufficiently reliable connection which can be easily and quickly attached and detached. Given the tolerances involved in ensuring that the projecting members still can be slid easily into and out of the channel, however, tapers and angles such as exemplified in the preferred embodiment are preferred. Other factors being equal, such tapers and angles allow a closer fit between the projecting members and the upper portion of the channel, thereby contributing to better strength and stress transfer characteristics in the connection.

By incorporating the tapers and angles, however, another important advantage may be more easily achieved. While this is not readily apparent from the drawings, the projecting members 24, though still corresponding substantially to the channel 14, may be slightly oversized relative to the upper portion of the channel 14. Preferably, this oversizing is accomplished by varying one or more of the corresponding tapers or angles in the channels 14 and projecting members 24 relative to each other. Such Variance need not be great, and the corresponding tapers and angles remain substantially equal. In this manner, the projecting members 24 may be wedged into the upper portion of the channels 14 and will tend to stick there.

The degree to which the projecting members will tend to wedge in the channels will depend on a number of factors, including the elasticity of the casing and the projecting members, the degree of the tapers and angles, the surface area of the engagement points between the casing and the terminal blocks, and the degree to which the projecting members are oversized relative to the channel. It will be appreciated, however, that the factors can be varied to produce a terminal block with varying degrees of "stick".

For example, institutional customers will tend to use a single handle to move many batteries, and for those customers it may be desirable to have the terminal blocks fall out under their own weight as soon as the handle is released. Alternatively, it may be desirable to enable the terminal block to be wedged in the channel by a slight tug of the handle and dislodge with minimal pressure. For consumer applications, where every battery will be sold with a handle and it is important to avoid accidental disengagement and loss of the handle during the distribution process, the attachment may be designed so that the blocks may be removed only with relatively greater force, e.g., by tapping the blocks with a hammer.

In order to make the battery more adaptable to a wider degree of battery mounting devices, it is preferable to recess the channel 14 into the casing 10, for example, as can be seen in FIG. 2. In that way, when the handle 20 is removed, no part of the handle attachment assembly projects from the overall geometry of the casing 10. Thus, the likelihood of such projections interfering with a particular type of mounting device is eliminated.

Moreover, unlike any prior art designs, those components of this preferred embodiment of the subject invention which are disposed on the casing, namely, the channel 14, are relatively inconspicuous. Thus, when the handle 20 is removed from the casing 10, its absence is not readily detected and the aesthetic appeal of the battery is not diminished.

In the preferred embodiment, the upper end 19 of the channel 14 is closed to prevent the projecting members 24 from passing through the channel 14. It also will be appreciated that the frictional engagement which results from the oversizing of the projecting members 24 also provides means for terminating the movement of the projecting members 24 through the interior of the channels 14, such that it may not be necessary to close the upper ends of the channels. Other such means may be provided, however, such as by enlarging the rear ends of the projecting members or by providing them with various enlargements designed to engage the open ends of the channels.

The handle shown with the preferred embodiment comprises a grip 21 and a pair of terminal blocks 23, all composed of an injection molding thermoplastic polymer, connected by cords 22. Such handles are sturdy and reliable and may be easily manufactured. The precise configuration of the handle, however, is a matter of convenience. For example, the handle may be a unitary piece of plastic and projecting members may be disposed on the ends of a unitary handle rather than being disposed on terminal blocks as shown in the preferred embodiment.

Likewise, the precise configuration of the casing, and its components, is largely a matter of convenience dictated by other considerations unrelated to the subject invention. However, to the extent that the overall shape and size of the casing is designed with the intention of accommodating the battery in as wide a range of mounting devices as possible, it also will be preferable to recess the channels as discussed above.

It will be appreciated that the various components of the battery handle connecting assembly of the subject invention may be easily made by conventional techniques. The casing and terminal blocks preferably are composed of a thermoplastic polymer, such as propylene/ethylene copolymers. They may be made by conventional injection molding techniques. It will be appreciated that the preferred embodiments, because of the partially open, lipped construction of the channel 14 and the tapers and angles provided on the channel 14 and projecting members 24, may be more easily made as well as providing the other benefits described above. They may be molded with molds which can be opened by a single action, as opposed to double action, and require less complicated molds and molds which can be more easily withdrawn to complete the molding process.

Also, it will be appreciated that the specific preferred embodiment disclosed above will enable a battery manufacturer to offer two models—one with a handle which is self-disengaging or very easily disengaged and one that will be resistent to inadvertent disengagement—using much of the same tooling. That is, for example, the molds for the casing could be the same for both models. Different molds would be required for the normal and oversized terminal blocks, but even they would differ only slightly from each other.

The exact size of the various components is largely a matter of choice. Obviously, a certain size is needed to achieve a minimum degree of strength, regardless of the material and design used for the assembly. However, a wide range of sizes and shapes will provide satisfactory results.

For example, applicants expect that an assembly as illustrated in FIGS. 1-6 can be used with excellent results with the average lead-acid battery when it has the following approximate dimensions: terminal block—1.5"×1.75"×0.38"; projecting member on terminal block—1.0"×1.5"×0.16"; taper on side surfaces of projecting members—2°-3° ; angle on side and forward surfaces of projecting members—32°.

This invention has been disclosed and discussed primarily in terms of specific preferred embodiments, but it is not intended to be limited thereto. For example, a preferred embodiment is shown as having channels disposed on the casing and projecting members disposed on the handle. Such features may be reversed, however, with the channels being disposed on the battery handle and the projecting members being disposed on the casing for example, as shown in the second preferred embodiment depicted in FIGS. 7-12. This second preferred embodiment is substantially identical to the first preferred embodiment except that the channels 14' are provided in the terminal blocks 23' of the battery handle 20 and the projecting members 24' are disposed on the side wall of the container 11.

As best shown in FIG. 10, and especially, the lines drawn in phantom, the channel 14' is pattered inwardly from its open end 15 along one or more of its inner walls, and specifically, its opposing side walls 16', shown in FIG. 12. Likewise, the outer surfaces of the projecting members 24' are correspondingly tapered. That is, as best seen by comparing FIGS. 9-12, the outward taper from the front ends 25' of the projecting members 24' to their rear ends 29' along their side surfaces 26' are substantially the same as the inward taper int he opposing side walls 16' of the channels 14'. When the projecting members 24' are fully inserted into the channels 14', the forward surface 28' and side surfaces 26' of the projecting members 24' substantially abut the end wall 18' and side walls 16' of the channels 14'. The forward profile of the front end 25' of the projecting member 24' will be smaller than the open end 15' of the channel 14', thereby making it easier to orient the terminal block 23' for insertion of the projecting members 24' into the channel 14'.

As can be seen in FIGS. 11 and 12, one or more of the inner walls of the channel 14'. in this second embodiment, the end wall 18' and opposing side walls 16', are angled inwardly form the bottom 17' of the channel 14'. The forward surface 28' and side surfaced 26' of the projecting members 24' have corresponding angles. That is, the angles between the bottom wall 17' and end 18' and opposing side walls 16' of the channel 14' are substantially the same as, respectively, the angels between the bottom surface 27' and the forward 28' and side surfaces 26' of the projecting members 24'. In this manner, the channel 14' and projecting member 24' can be engaged in a dove-tail fashion.

Also, the preferred embodiment is shown with the channel being disposed on the side walls of the battery container. Channels or projection members may be disposed elsewhere on the casing, e.g., on the side walls or top surface of the battery cover. By situating the connection point on the container, however, there is little concern that excessive stress will be transferred to the seal between the container and cover.

The channel also is shown as a partially open, lipped channel. It may be closed, however, such that a pocket-like channel is formed. The projection member, in such an arrangement, would be a compatibly shaped tongue-like member, offset and disposed generally parallel to the terminal end of the handle. Other modifications and embodiments will be apparent to the worker in the art.

We claim:

1. An assembly for removably attaching a battery handle to a battery casing, which assembly comprises a pair of channels and a pair of projecting members slidably engageable with said channels, wherein
    (a) said channels are disposed on said battery casing and said projecting members are disposed on said battery handle, or vice versa,
    (b) said channels have an open end adapted to allow passage of said projecting members into and out of the interior of said channel,
    (c) said assembly comprises means for limiting the travel of said projecting members through the interior of said channels such that said projecting members are unable to pass through the other end of said channels,
    (d) said channels and projecting members are disposed such that said handle may be attached and detached to said casing by slidably inserting and withdrawing said projecting members from the interior of said channels through said open ends and when said projecting members are disposed in the interior of said channels and the battery is lifted by said handle, said projecting members are urged against said travel limiting means, and
    (e) at least a portion of said projecting members is slightly oversized relative to said channels whereby when said handle is not in use, one or more of the surfaces of said projecting members frictionally engages one or more of the walls of said channels and enables said projecting members to wedge into and stick in said channels.

2. An assembly for removably attaching a battery handle to a battery casing, which assembly comprises a pair of channels and a pair of projecting members slidably engageable with said channels, wherein
    (a) said channels are disposed on said battery casing and said projecting members are disposed on said battery handle, or vice versa, (b) said channels have an open end adapted to allow passage of said projecting members into and out of the interior of said channel, (c) said assemlby comprises means for limiting the travel of said projecting members through the interior of said channels such that said projecting members are unable to pass through the other end of said channels, (d) said channel is tapered inwardly from its open end along one or more of is inner walls and the projecting members are correspondingly tapered along one or more of their surfaces, and (e) said channels and projecting members are disposed such that said handle may be attached and detached to said casing by slidably inserting and withdrawing said projecting members from the interior of said channels through said open ends and, when said projecting members are disposed in the interior of said channels and the battery is lifted by said handle, said projecting members are urged against said travel limiting means.

3. An assembly for removably attaching a battery handle to a battery casing, which assembly comprises a pair of channels an a pair of projecting members slidably engageable with said channels, wherein (a) said channels are disposed on said battery casing and said projecting members are disposed on said battery handle, or vice versa, (b) said channels have an open end adapted to allow passage of said projecting members into and out of the interior of said channel, (c) said assembly comprises means for limiting the travel of said projecting members through the interior of said channels such that said projecting members are unable to pass through the other end of said channels, and (d) one or more of the inner walls of said channels are angled inwardly and one or more of the surfaces of said projecting members are correspondingly angled, and (e) said channels and projecting members are disposed such that said handle may be attached and detached to said casing by slidably inserting and withdrawing said projecting members from the interior of said channels through said open ends and, when said projecting members are disposed in the interior of said channels and the battery is lifted by said handle, said projecting members are urged against said travel limiting means.

4. The battery handle attachment assembly of claim 2, wherein one or more of the inner walls of said channels are angled inwardly and one or more of the surfaces of said projecting members are correspondingly angled.

5. The battery handle attachment assembly of claim 2, wherein one or more of the surfaces of said projecting member frictionally engages one or more of the walls of said channel.

6. The battery handle attachment assembly of claim 3, wherein one or more of the surfaces of said projecting member frictionally engages one or more of the walls of said channel.

7. The battery handle attachment assembly of claim 4, wherein one or more of the surfaces of said projecting member frictionally engages one or more of the walls of said channel.

8. The battery handle attachment assembly of claim 1, wherein said battery handle comprises terminal blocks and said projecting members are disposed on said terminal blocks.

9. The battery handle attachment of claim 2, wherein said battery handle comprises terminal blocks and said projecting members are disposed on said terminal blocks.

10. The battery handle attachment assembly of claim 3, wherein said battery handle comprises terminal blocks and said projecting members are disposed on said terminal blocks.

11. The battery handle attachment assembly of claim 7, wherein said battery handle comprises terminal blocks and said projecting members are disposed on said terminal blocks.

12. The battery handle attachment assembly of claim 1, wherein said channels are recessed in said casing.

13. The battery handle attachment assembly of claim 2, wherein said channels are recessed in said casing.

14. The battery handle attachment assembly of claim 3, wherein said channels are recessed in said casing.

15. An assembly for removably attaching a battery handle to a battery casing, which assembly comprises a pair of channels and a pair of projecting members slidably engageable with said channels, wherein (a) said channels are recessed in said battery casing and said projecting members are disposed on said battery handle, (b) said channels have an open end adapted to allow passage of said projecting members into and out of the interior of said channel, (c) said assembly comprises means for limiting the travel of said projecting members through the interior of said channels such that said projecting members are unable to pass through the other end of said channels, (d) one or more of the surfaces of said projecting members frictionally engages one or more of the walls of said channels, and (e) said channels and projecting members are disposed such that said handle may be attached and detached to said casing by slidably inserting and withdrawing said projecting members from the interior of said channels through said open ends and, when said projecting members are disposed in the interior of said channels and the battery is lifted by said handle, said projecting members are urged against said travel limiting means.

16. The battery handle attachment assembly of claim 7, wherein said channels are recessed in said casing.

17. The battery handle attachment assembly of claim 8, wherein said channels are recessed in said casing.

18. The battery handle attachment assembly of claim 11, wherein said channels are recessed in said casing.

19. An electric storage battery comprising a casing and a handle, wherein said handle is removably attached to said casing by the handle attachment assembly of claim 1.

* * * * *